(12) United States Patent
Hirabayashi

(10) Patent No.: US 6,622,156 B2
(45) Date of Patent: Sep. 16, 2003

(54) METHOD AND SYSTEM FOR TRANSFERRING JOB BETWEEN COMPUTERS

(75) Inventor: Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/812,781

(22) Filed: Mar. 15, 2001

(65) Prior Publication Data

US 2001/0010055 A1 Jul. 26, 2001

Related U.S. Application Data

(63) Continuation of application No. 09/553,762, filed on Apr. 21, 2000, now Pat. No. 6,549,936.

(30) Foreign Application Priority Data

Apr. 22, 1999 (JP) ............................................ 11-114335

(51) Int. Cl.7 ................................................. G06F 9/00
(52) U.S. Cl. ........................ 709/102; 709/101; 709/200; 709/201; 709/202; 709/205; 709/206
(58) Field of Search ................................. 709/101, 102, 709/103, 200, 201, 202, 205, 206

(56) References Cited

U.S. PATENT DOCUMENTS

| | | | | | |
|---|---|---|---|---|---|
| 5,796,951 A | * | 8/1998 | Hamner et al. | ............. | 709/223 |
| 5,805,884 A | * | 9/1998 | Sitbon et al. | ................ | 709/300 |
| 5,862,330 A | * | 1/1999 | Anupam et al. | ............ | 709/204 |
| 5,898,835 A | * | 4/1999 | Truong | ........................ | 709/217 |
| 5,978,829 A | * | 11/1999 | Chung et al. | ................ | 709/102 |
| 6,044,394 A | * | 3/2000 | Cadden et al. | .............. | 709/107 |
| 6,065,039 A | * | 5/2000 | Paciorek | ...................... | 709/202 |
| 6,065,040 A | * | 5/2000 | Mima et al. | ................. | 709/202 |
| 6,112,225 A | * | 8/2000 | Kraft et al. | .................. | 709/202 |
| 6,141,681 A | * | 10/2000 | Kyle | .......................... | 709/206 |
| 6,182,110 B1 | * | 1/2001 | Barroux | ...................... | 709/201 |
| 6,202,080 B1 | * | 3/2001 | Lu et al. | ..................... | 709/105 |
| 6,282,563 B1 | * | 8/2001 | Yamamoto et al. | ......... | 709/202 |
| 6,470,375 B1 | * | 10/2002 | Whitner et al. | .............. | 709/105 |
| 6,477,572 B1 | * | 11/2002 | Elderton et al. | ............. | 709/224 |
| 6,490,611 B1 | * | 12/2002 | Shen et al. | .................. | 709/103 |
| 6,493,739 B1 | * | 12/2002 | Dolin et al. | ................. | 709/102 |
| 6,496,872 B1 | * | 12/2002 | Katz et al. | ................... | 709/318 |

OTHER PUBLICATIONS

"Submitting a NQS Batch Job" by Institute for Scientific Computation (http://www.isu.tamu.edu/isc/nqs/gsub_main.html).

* cited by examiner

*Primary Examiner*—Saleh Najjar
(74) *Attorney, Agent, or Firm*—Antonelli, Terry, Stout & Kraus, LLP

(57) ABSTRACT

In a job transferring method of sending a request from a first computer to a second computer so as to cause the second computer to register and execute a job, the request is created so that it can include a plurality of scripts, the script being an aggregation of a plurality of commands. For example, the first computer creates a request data stream that includes the content of the plurality of scripts, then sending the created request data stream to the second computer. Moreover, the second computer extracts the content of the plurality of scripts included in the request data stream and stores the content as a script file for each script, then executing a script to be executed first of the plurality of scripts.

9 Claims, 12 Drawing Sheets

ENTIRE SYSTEM CONFIGURATION

COMMUNICATION SEQUENCE OF JOB REGISTRATION, STATE ALTERATION, DELETION REQUEST, QUEUE ENUMERATION

COMMUNICATION SEQUENCE OF JOB-INFORMATION ACQUISITION

<REQUEST DATA STREAM>

<RESPONSE DATA STREAM>

FIG. 8A  qsub [(-t TRANSFER SOURCE FILE NAME (= TRANSFER TARGET FILE NAME)) ··· ]

FIG. 8B  qsub oje_test -q p_oje -t "test01. jcl = script (scripta)"

FIG. 8C  CASE OF TRANSFERRING TWO qsub oje_test -q p_oje -t "test01. jcl = script (scripta)" -t test01. jcl2 = script (scriptb) -start "script (scriptb)"

FIG. 6

EXAMPLE OF SCRIPT TRANSFERRING STREAM

SENDSCRIPT = yes ;

SCRIPTSTART = script / scriptb ;

SCRIPTNAME = script / scripta ;

SCRIPTLINES = 4 ;

SCRIPTBODY = # ! / bin / ksh ;

SCRIPTBODY = xxx ;

SCRIPTBODY = xxx ;

SCRIPTBODY = xxx ;

SUBSET = END

SCRIPTNAME = script / scriptb ;

SCRIPTLINES = 4 ;

SCRIPTBODY = # ! / bin / ksh ;

SCRIPTBODY = xxx ;

SCRIPTBODY = xxx ;

SCRIPTBODY = xxx ;

SUBSET = END (NULL)

FIG. 7

CONTENT EXAMPLE OF JOB PARAMETER DEFINITION FILE
[Job]
E-Time = 1 ~ 1440
ClientHost = HOST NAME
MessageUserName = USER NAME
MessageHostName = COMPUTER NAME
StartTime = TIME AND DATE OF STARTING JOB-EXECUTION
Interactive = YES/NO
JobTrans = YES/NO
[Trans]
TransFileNumber = THE NUMBER OF TRANSFER FILES
TransSourceFile 1 = TRANSFER SOURCE FILE NAME1
TransTargetFile 1 = TRANSFER TARGET FILE NAME1
TransSourceFile 2 = TRANSFER SOURCE FILE NAME2
TransTargetFile 2 = TRANSFER TARGET FILE NAME2
.
.
.

TransSourceFile n = TRANSFER SOURCE FILE NAME n(n IS 1 ~ THE NUMBER OF TRANSFER FILES) (ESSENTIAL BY THE NUMBER OF TRANSFER FILES)

TransTargetFile n = TRANSFER TARGET FILE NAME n(n IS 1 ~ THE NUMBER OF TRANSFER FILES) (ESSENTIAL BY THE NUMBER OF TRANSFER FILES)

[Command]
FilePath = COMMAND (ESSENTIAL)
CommandLine = PARAMETER
CurrentPath = OPERATION FOLDER NAME
ScriptStart = TRANSFER TARGET FILE NAME2
.
.
.

[Variable]
XXX-XXX
.
.
.

FIG. 13

EXAMPLE OF JOB REGISTRATION SCREEN

| BATCH REQUEST OPTION | | | |
|---|---|---|---|
| DATE TIME | (-a) | ◇ SPECIFY ◆ UNSPECIFY | |
| PRIORITY | (-p) | ◇ SPECIFY ◆ UNSPECIFY | |
| HOLDING STATE | (-h) | ◇ SPECIFY ◆ UNSPECIFY | |
| REQUEST-NAME | (-r) | ◆ SPECIFY ◇ UNSPECIFY | job1 |
| SEND A REPORT BY MAIL | (-mb,-me) | ☐ BEGIN ☐ END | |
| RECEIVE MAIL-USER-NAME | (-mu) | ◇ SPECIFY ◆ UNSPECIFY | |
| STDOUT-OUTPUT-FILE-NAME | (-o) | ◇ SPECIFY ◆ UNSPECIFY | |
| STDERR-OUTPUT-FILE-NAME | (-e) | ◇ SPECIFY ◆ UNSPECIFY | |
| REDIRECTS ALL THE OUTPUT | (-eo) | ◇ SPECIFY ◆ UNSPECIFY | |
| SHELL-NAME | (-s) | ◇ SPECIFY ◆ UNSPECIFY | |
| EXPORTS ENVIRONMENT-VARIABLE | (-x) | ◇ SPECIFY ◆ UNSPECIFY | |
| GROUP-NAME | (-g) | ◇ SPECIFY ◆ UNSPECIFY | |
| KEEP STDOUT-OUTPUT-FILE-NAME | (-ko) | ◇ SPECIFY ◆ UNSPECIFY | |
| KEEP STDERR-OUTPUT-FILE-NAME | (-ke) | ◇ SPECIFY ◆ UNSPECIFY | |
| CANNOT BE RESTARTED | (-nr) | ◇ SPECIFY ◆ UNSPECIFY | |
| SUPPRESSES DISPLAYING OF MESSAGES | (-z) | ◇ SPECIFY ◆ UNSPECIFY | |
| PROJECT-NAME | (-pj) | ◇ SPECIFY ◆ UNSPECIFY | |
| ARGUMENT-LIST | (-args) | ◇ SPECIFY ◆ UNSPECIFY | |
| | | | |
| DEFINE ENVIRONMENT VARIABLE | (-n) | ◇ SPECIFY ◆ UNSPECIFY | LANG = C |
| | | | |
| DEFINE SCRIPT TRANSFER | (-t) | ◇ SPECIFY ◆ UNSPECIFY | test01.jcl = script(scripta)<br>test01.jcl2 = script(scriptb) |

1301  1302  1303

1304

[ OK ] [ RESOURCE SPECIFICATION ] [ AUTOMATIC PRINT ] [ CANCEL ]

EXAMPLE OF JOB STATE DISPLAY

METHOD AND SYSTEM FOR TRANSFERRING JOB BETWEEN COMPUTERS

This is a continuation of application Ser. No. 09/553,762, filed Apr. 21, 2000, now U.S. Pat. No. 6,549,936.

BACKGROUND OF THE INVENTION

The present invention relates to a method and a system for transferring a job between computers. In particular, it relates to a job transferring method and its system that make it possible to transfer a plurality of scripts.

Since conventionally, there has been known the following job transferring method: One computer transfers a batch job to another computer, and another computer executes the batch job and returns the result of the execution back to the computer of the job transfer source. The batch job is useful at the time when a computer not only wishes to execute one business application but also wishes to execute another business application simultaneously in the meantime. When a job (i.e., business application software) is transferred to the computer, the job is once registered in a queue within the computer. At this point in time, it becomes possible to receive transfer of the next job (i.e., another business application). The system fetches and executes, in sequence, the jobs registered in the queue. The operation of such a batch job is absolutely necessary for implementing the setting and the automatization of a business application such as a total accumulating processing of data to be executed on a daily or monthly basis.

As the job transferring method as described above, there has been known various types of methods. When classified roughly, there exists the following three types: In the job transferring method of the first type, one computer simply provides a job-executing instruction to another computer and performs nothing else. Transfer of a script, which will be described later, is not performed. The computer that had issued the job-executing instruction receives the execution state and result of the instructed job as status information sent from the computer that has executed the job. In the job transferring method of the second type, one script is transferred immediately before the one computer provides the job-executing instruction to another computer. In this case, the execution result of the instructed job is returned as a single result file. The script is an aggregation of a plurality of commands provided to the computer executing the job. Some script is set so that it is capable of performing a simple control such as a conditional branch. The use of the script makes it possible to perform, with a one-time input of the job, a sequence of executions including the plurality of commands. In the job transferring method of the third type, a script file, aside from the job-executing instruction, has been transferred in advance as a file transfer or file distribution form, and the job-executing instruction is performed later.

The job transferring methods of the first and second types mentioned above will be understood for example by qsub commands explained in "Submitting a NQS Batch Job", by Institute for Scientific Computation, http://www.isc.edu/isc/nqs/qsub-main.html.

SUMMARY OF THE INVENTION

There are many cases where, in the job transfer, it is desirable to make the computer of the job transfer target call up another script from one script and execute another script. In this occasion, it turns out that a single job includes a plurality of scripts. None of the above-described conventional methods of the first to the third types, however, has succeeded in performing the executing instruction of the plurality of scripts simultaneously with the performance of transferring the plurality of scripts. This situation makes it unavoidable to employ a method in which the plurality of scripts have been transferred in advance and, at the time of the execution, only the job-executing instruction is performed. This method is simply a combination of the above-described conventional technique of the third type and that of the first type. In the method of this combination type, however, it is required to continue managing the script file all the while until the job-executing command has been sent. On account of this, the version management thereof and so on become complicated. This condition will give rise to the following problems: If the script file is forgotten to be transferred, a wrong job may be executed. Otherwise, immediately before the execution of a job, a related script has been created or modified already and, as a result, it becomes impossible to execute the job.

In view of the above-described problems in the conventional techniques, it is an object of the present invention to provide a job transferring method and its system that, in the job transferring method between computers, allow the job-executing instruction to be performed simultaneously with the performance of transferring the plurality of scripts.

In order to accomplish the above-described object, the present invention is characterized by the following: A job transferring method of sending a request from a first computer to a second computer so as to cause the second computer to register and execute a job, wherein a plurality of scripts are included in the above-mentioned request, the script being an aggregation of a plurality of commands.

Also, the present invention is characterized by the following: A job transferring method of sending a request from a first computer to a second computer so as to cause a job to be registered and executed, including a step of creating, by the first computer, a request data stream including content of a plurality of scripts, and a step of sending, by the first computer, the created request data stream from the first computer to the second computer.

Also, the present invention is characterized by the following: A job transferring method of sending a request from a first computer to a second computer so as to cause a job to be registered and executed, including a step of receiving, by the second computer, a request data stream sent from the first computer, the request data stream including content of a plurality of scripts, a step of extracting, by the second computer, the content of the plurality of scripts in the received request data stream and storing the content of the plurality of scripts as a script file for each script, and a step of executing, by the second computer, a script to be executed first of the plurality of scripts.

Also, the present invention is characterized by the following: A job transferring method of sending a request from a first computer to a second computer so as to cause a job to be registered and executed, including a step of creating, by the first computer, a request data stream including content of a plurality of scripts, a step of sending the created request data stream from the first computer to the second computer, a step of extracting, by the second computer, the content of the plurality of scripts in the request data stream and storing the content of the plurality of scripts as a script file for each script, and a step of executing, by the second computer, a script to be executed first of the plurality of scripts.

Also, the present invention is characterized by the following: A job transferring method of sending a request from a first computer to a second computer so as to cause a job to be registered and executed, including a step of creating, by the first computer, a request data stream, the request data stream including content of a plurality of scripts and an executing instruction for a script to be executed first of the plurality of scripts, a step of sending the created request data stream from the first computer to the second computer, a step of extracting, by the second computer, the content of the plurality of scripts in the request data stream and storing the content of the plurality of scripts as a script file for each script, and a step of fetching and executing, by the second computer, the executing instruction for the script to be executed first, the executing instruction being included in the request data stream.

It is preferable that the above-described request data stream should be a text data-formatted stream and, utilizing predetermined tags, describe various types of parameter information.

Moreover, the present invention is characterized by the following: A job transferring method of sending a request from a first computer to a second computer so as to cause a job to be registered and executed, including a step of sending, by the second computer, a plurality of result files from the second computer to the first computer, the plurality of result files being created as a result of the second computer's executing the job, and a step of receiving, by the first computer, the plurality of result files.

Also, the present invention is characterized by the following: A job transferring method of sending a request from a first computer to a second computer so as to cause a job to be registered and executed, including a step of creating a response data stream including content of a plurality of result files, the plurality of result files being created as a result of the second computer's executing the job, a step of sending the created response data stream from the second computer to the first computer, and a step of extracting, by the first computer, the content of the plurality of result files in the response data stream and storing the content of the plurality of result files for each result file. It is preferable that the above-described response data stream should be a text data-formatted stream.

Also, the present invention is characterized by the following: A job transferring system, including a first computer for sending a second computer a request for causing a job to be registered and executed and the second computer for receiving the request sent from the first computer so as to register and execute the job in accordance with the request, wherein a plurality of scripts are included in the above-mentioned request, the script being an aggregation of a plurality of commands.

Also, the present invention is characterized by the following: A first computer of a job transfer source in a job transferring system that includes the first computer for sending a second computer a request for causing a job to be registered and executed and the second computer for receiving the request sent from the first computer so as to register and execute the job in accordance with the request, the first computer including means for creating a request data stream including content of a plurality of scripts, and means for sending the created request data stream to the second computer.

Also, the present invention is characterized by the following: A second computer of a job transfer target in a job transferring system that includes a first computer for sending the second computer a request for causing a job to be registered and executed and the second computer for receiving the request sent from the first computer so as to register and execute the job in accordance with the request, the second computer including means for receiving a request data stream sent from the first computer, the request data stream including content of a plurality of scripts, means for extracting the content of the plurality of scripts in the received request data stream and storing the content of the plurality of scripts as a script file for each script, and means for executing a script to be executed first of the plurality of scripts.

Also, the present invention is characterized by the following: A job transferring system, including a first computer for sending a second computer a request for causing a job to be registered and executed and the second computer for receiving the request sent from the first computer so as to register and execute the job in accordance with the request, wherein the first computer includes means for creating a request data stream including content of a plurality of scripts, and means for sending the created request data stream from the first computer to the second computer, and the second computer includes means for extracting the content of the plurality of scripts in the request data stream and storing the content of the plurality of scripts as a script file for each script, and means for executing a script to be executed first of the plurality of scripts.

Also, the present invention is characterized by the following: A job transferring system, including a first computer for sending a second computer a request for causing a job to be registered and executed and the second computer for receiving the request sent from the first computer so as to register and execute the job in accordance with the request, wherein the first computer includes means for creating a request data stream, the request data stream including content of a plurality of scripts and an executing instruction for a script to be executed first of the plurality of scripts, and means for sending the created request data stream from the first computer to the second computer, and the second computer includes means for extracting the content of the plurality of scripts in the request data stream and storing the content of the plurality of scripts as a script file for each script, and means for fetching and executing the executing instruction for the script to be executed first, the executing instruction being included in the request data stream.

It is preferable that the above-described request data stream should be a text data-formatted stream and, utilizing predetermined tags, describe various types of parameter information.

Also, the present invention is characterized by the following: A job transferring system, including a first computer for sending a second computer a request for causing a job to be registered and executed and the second computer for receiving the request sent from the first computer so as to register and execute the job in accordance with the request, wherein the second computer includes means for sending a plurality of result files from the second computer to the first computer, the plurality of result files being created as a result of executing the job, and the first computer includes means for receiving the plurality of result files.

Also, the present invention is characterized by the following: A job transferring system, including a first computer for sending a second computer a request for causing a job to be registered and executed and the second computer for receiving the request sent from the first computer so as to register and execute the job in accordance with the request, wherein the second computer includes means for creating a response data stream including content of a plurality of result files, the plurality of result files being created as a result of executing the job, and means for sending the created response data stream from the second computer to the first computer, and the first computer includes means for extracting the content of the plurality of result files in the response data stream and storing the content of the plurality of result files for each result file. It is preferable that the above-described response data stream should be a text data-formatted stream.

BRIEF DESCRIPTION OF THE DRAWINGS

FIG. 6 is a diagram for illustrating an example of the description of scripts in a request body;

FIG. 7 is a diagram for illustrating the content of a job parameter definition file;

FIGS. 8A, 8B and 8C are diagrams for illustrating examples of a job registering command;

FIG. 13 is a diagram for illustrating an example of a job registration screen and FIG. 14 is a diagram for illustrating an example of a job state display.

DESCRIPTION OF THE EMBODIMENTS

Figure 1:
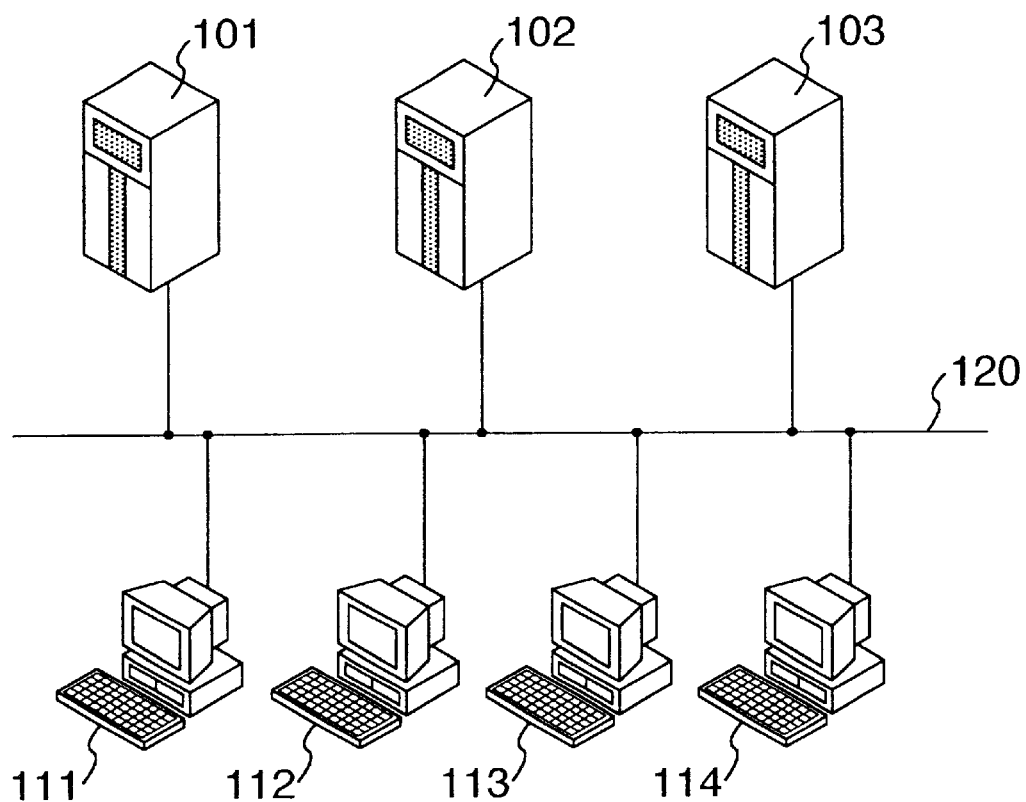
FIG. 1 is a diagram for illustrating an example of the entire configuration of a system to which the job transferring method relating to the present invention is applied.

Hereinafter, referring to the drawings, the detailed explanation will be given concerning an embodiment of the present invention.

FIG. 1 illustrates an example of the entire configuration of a system to which the job transferring method relating to the present invention is applied. In FIG. 1, reference numerals 101–103 denote computers that become servers each. Reference numerals 111–114 denote computers that become clients each. The servers 101–103 and the clients 111–114, which are connected to a network 120, are capable of providing/receiving various kinds of information among the respective apparatuses. The respective clients 111–114 are able to carry out the following processing: Registering a job into the respective servers 101–103, and causing the respective servers to execute the job in a batch-processing manner, and then causing the respective servers to return the result back to the respective clients. Concretely speaking, registering the job means that a program-executing instruction written in a predetermined job control language is transferred to a server. At the time of this job transfer, a plurality of scripts to be executed on the server can be included into the transfer data. This condition makes it possible to simultaneously instruct transfer of the plurality of scripts and the execution thereof through the job registration at a one-time, thereby being capable of causing the server to perform complicated processings. Being able to transfer the job in being divided into the plurality of scripts makes it easier to create or manage the scripts. It is also possible to execute the job by creating or modifying the scripts immediately before the execution.

Platforms (for example, UNIX, a mainframe, or Windows NT (i.e., brand name of Microsoft Corporation)) that are independent of each other can be used as the respective servers and the respective clients. As the clients, various types of schemes, for example, a job launcher client and a WWW browser client, can be used. Also, it is also possible to perform the job registration by using a predetermined API (application program interface) from a variety types of user programs. The operations needed for the job registration from the client to the server are, for example, an operation of inputting a predetermined command or an operation of the instruction using a predetermined GUI (graphical user interface). The job (request) registered in the server is once registered in a queue. The client can display the state of the queue by inquiring of the server about the state, or can cancel the job registered in the queue. It is allowable to provide a server gateway between the client and the server. The server gateway carries out the following processing: Receiving a variety types of requests (demand) from the respective clients, judging to which server the respective requests should be transferred, transferring the request to the server, receiving and summarizing, as response data, the request execution result from the server, and returning the response data back to the client of the request issue source.

Figure 2:
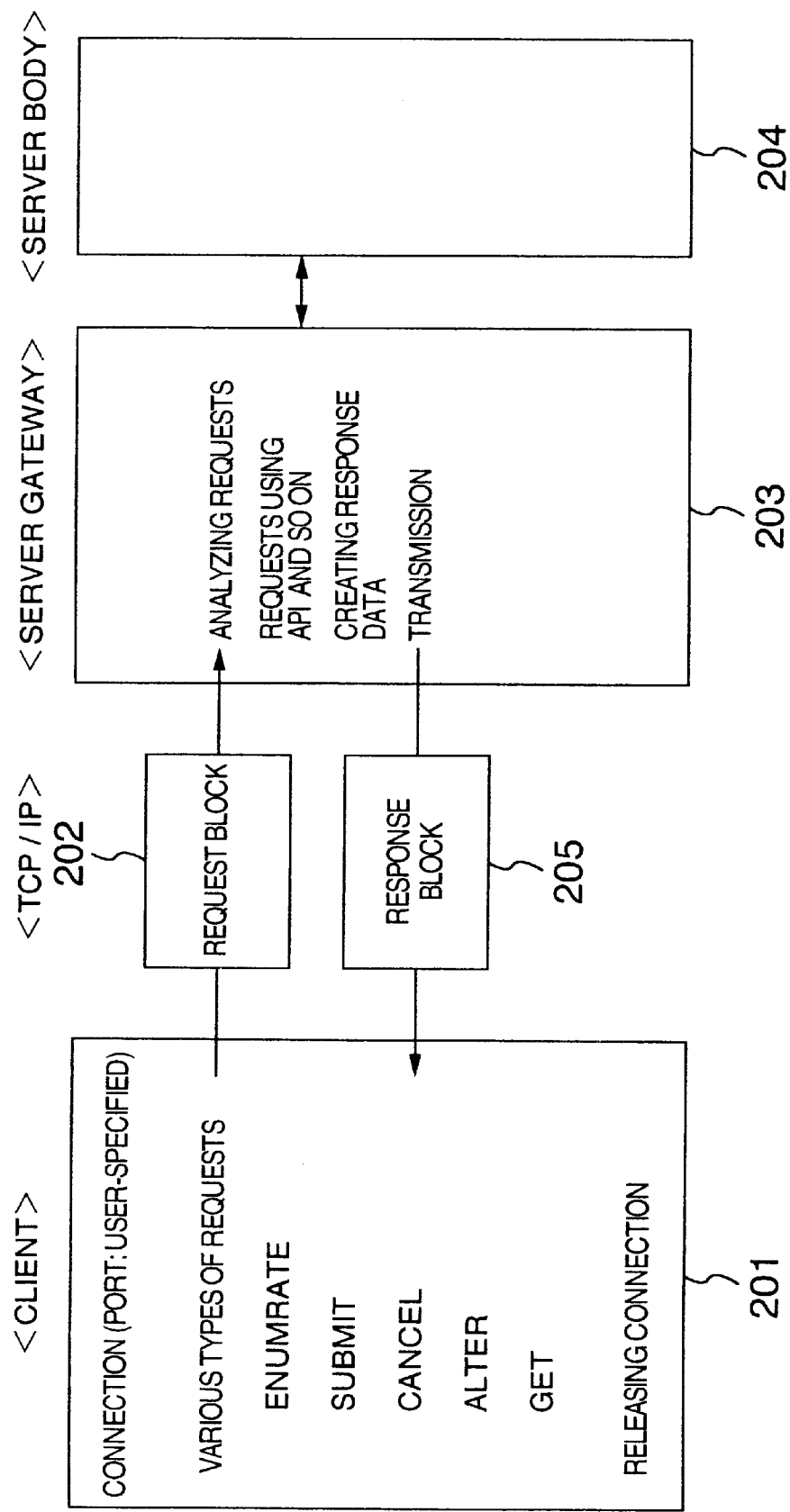
FIG. 2 is a diagram for explaining a basic operation of a communication protocol between a client and a server.

FIG. 2 is a diagram for explaining a basic operation of a communication protocol between a client and a server. Here, there is illustrated an example where a server gateway is provided between the client and the server.

The request issuing side is a client 201. In the client 201, in accordance with the input of the command or the instruction using the GUI, a program operates which issues various types of requests to a server. The program performs the processing in a procedure of connecting the client with a user-specified port and of issuing the various types of requests and of releasing the connection. As the various types of requests that the client issues, there can be mentioned SUBMIT (registration of a job), ALTER (alteration of job state), CANCEL (request for deletion of a job), ENUMRATE (enumeration of jobs existing in the queue), GET (acquisition of job information), and so on. A text-based request data stream referred to as a request block 202 transfers these requests to a server gateway 203.

The server gateway 203 receives the request block 202 transferred from the respective clients and analyzes the request, then judging to which server the request should be transferred. Furthermore, the server gateway 203 transfers the request to the corresponding server 204 and, receiving the execution result transferred from the server 204, creates the response data, and then creates a text-based response data stream 205 referred to as a response block 205 thereby returning the response data back to the client 201 of the request issue source. Additionally, the connections between these servers/clients are connected/disconnected in a unit of the request. Also, the server gateway may be situated on the same server as the server body.

Incidentally, it is also allowable to establish, using the request block 202 and the response block 205, direct communications between the client 201 and the server 204 without providing the server gateway 203. Providing the server gateway 203, however, allows a protocol to be converted by the server gateway 203, the protocol (the further details of which will be explained in FIGS. 3–6) resulting from using the request block 202 and the response block 205 on the network. This condition makes it possible to carry out communications between the server 204 and the server gateway 203 with the use of a protocol that has been provided to the server 204 since conventionally. Accordingly, there is no need of supporting a new protocol on the side of the server 204. Consequently, it becomes unnecessary to amend the side of the server 204, which is advantageous and convenient.

Figure 3:
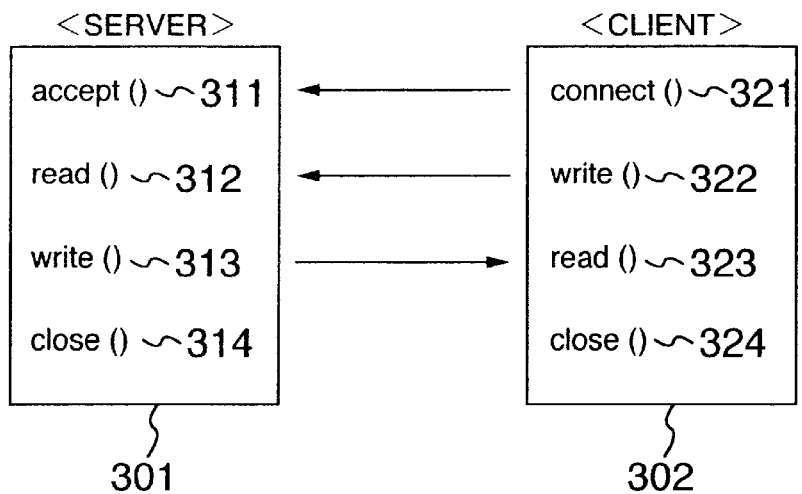
FIG. 3 is a diagram for illustrating a concrete communication sequence at the time of issuing requests.

FIG. 3 illustrates a concrete communication sequence at the time when the client issues the following requests: The job registration (SUBMIT), the state alteration (ALTER), the deletion request (CANCEL) and the queue enumeration (ENUMRATE). In accordance with an accept instruction, i.e., an accept( ) 311, a server 301 waits for a connect request from the client 302. A client 302 issues a connect instruction, i.e., a connect( ) 321, thereby establishing the connection with the server 301. After the connection is established, in accordance with a write instruction, i.e., a write( ) 322, the client 302 sends a request for any one of the above-described job registration (SUBMIT), the state alteration (ALTER), the deletion request (CANCEL) and the queue enumeration (ENUMRATE). In accordance with a read instruction, i.e., a read( ) 312, the server 301 receives the request and performs the processing in response to the request, then returning the result back to the client 302 in accordance with a write( ) 313. The client 302 receives the result in accordance with a read( ) 323. These reads and writes are repeated a plurality of times in correspondence with an amount of the data. After these processings, the server 301 executes a close, i.e., a close( ) 314 and the client 302 executes a close, i.e., a close( ) 324, thus terminating the communication sequence.

Figure 4:
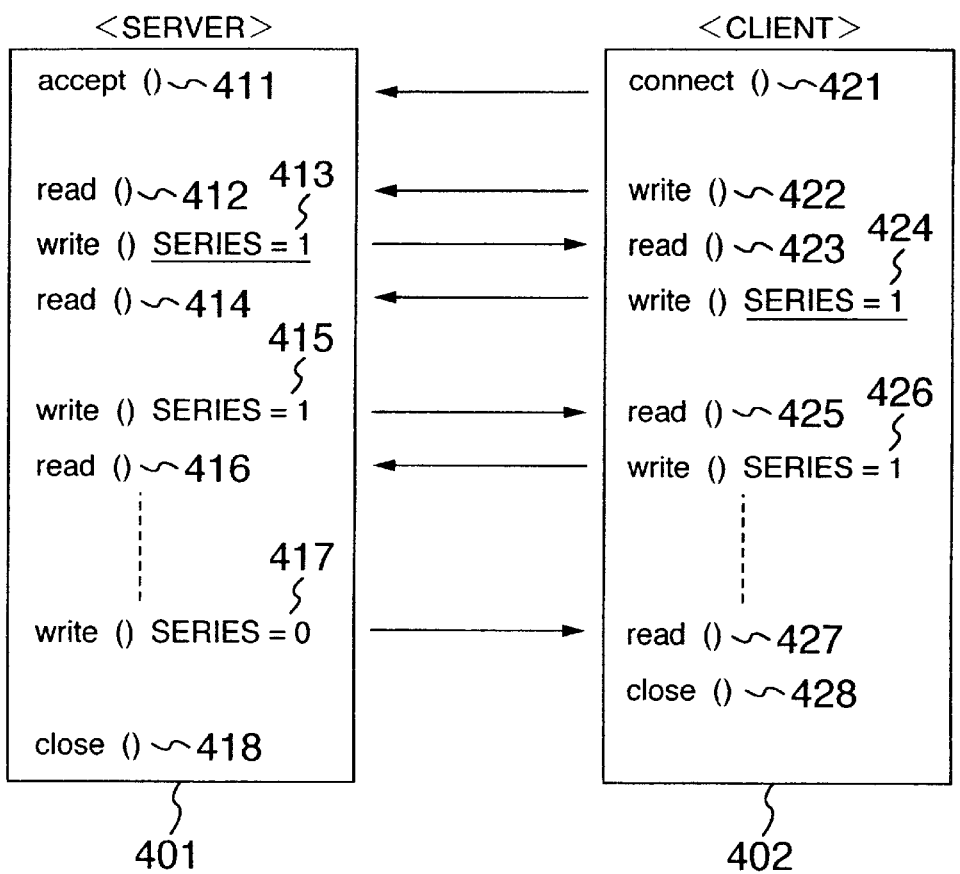
FIG. 4 is a diagram for illustrating a concrete communication sequence at the time of issuing a request for job-information acquisition.

FIG. 4 illustrates a concrete communication sequence at the time of issuing a request for the job-information acquisition (GET). In the acquisition of the job information (GET), there are some cases where a large amount of data is transmitted/received. Accordingly, the communication is executed in such a manner that the amount of the data transmitted/received at a time is limited. Concretely, the employment of a series tag controls continuation of the data and termination of the transmission/reception thereof. Also, in the job-information acquisition (GET), it is allowable to provide the server with a filer function based on acquisition conditions (the time range, the job name, and so on).

The explanation will be given below concerning the communication sequence of the job-information acquisition (GET) with the employment of the series tag. In accordance with an accept instruction, i.e., an accept( ) 411, a server 401 waits for a connect request from the client 402. A client 402 issues a connect instruction, i.e., a connect( ) 421, thereby establishing the connection with the server 401. After the connection is established, in accordance with a write( ) 422, the client 402 sends a request for a job-information acquiring request. In accordance with a read( ) 412, the server 401 receives the job-information acquiring request and prepares job information that is to respond to the request. Since the job information that is to respond is a large amount of data, with the series=1 set in a write( ) 413, a portion of the job information is sent to the client 402. Although the client 402 receives the portion of the job information in accordance with a read( ) 423, the portion of the job information has been sent with the series=1 set. Consequently, the client 402 issues a request for continuing to acquire the continued data with the series=1 set in a write( ) 424. The server 401 receives the job-information acquiring request in accordance with a read( ) 414 and, in answer to the request, sends the continued job information to the client 402 with series=1 set in a write( ) 415. As having been described until now, writes and reads (415, 416, 425, 426, . . . ) are repeated necessary times with series=1 set. When the job information sent from the server 401 becomes final data, the server 401 sends the final job information with the series=0 set in a write( ) 417. The client 402 receives the job information in accordance with a read( ) 427. The reception is performed with the series=0 set in the read( ) 427, and accordingly the client 402 is able to find that the job information is the final data. After these processings, the server 401 executes a close, i.e., a close( ) 418 and the client 402 executes a close, i.e., a close( ) 428, thus terminating the communication sequence.

Figure 5A:
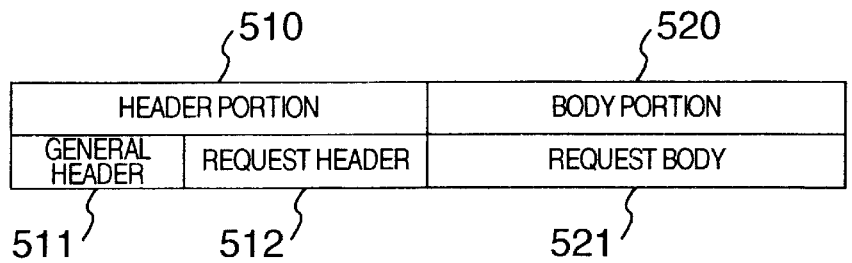
FIGS. 5A and 5B are diagrams for illustrating formats of communication data.
Figure 5B:
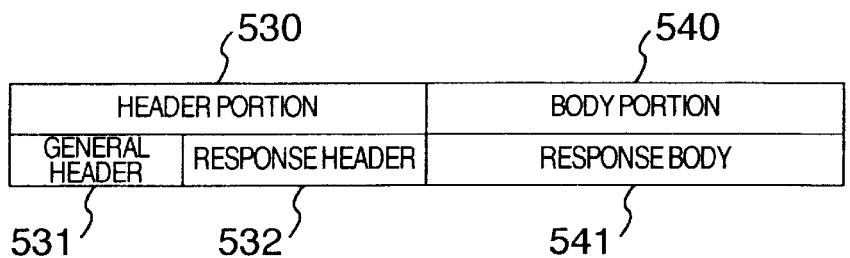

FIGS. 5A and 5B illustrate formats of communication data that are actually read and written at the time of sending the server the respective requests in the communication sequence illustrated in FIG. 3 or FIG. 4. FIG. 5A illustrates the request data stream (202 in FIG. 2) written from the client and read at the server. The request data stream includes a header portion 510 and a body portion 520. The header portion 510 includes a general header 511 and a request header 512. The body portion 520 includes a request body 521. FIG. 5B illustrates the response data stream (205 in FIG. 2) written from the server and read at the client. The response data stream includes a header portion 530 and a body portion 540. The header portion 530 includes a general header 531 and a response header 532. The body portion 540 includes a response body 541. These data are described in a text-based format of "tag name=value;". The character codes of the tag name and the specified value are all ASCII code.

The general headers 511, 531 include general information such as a version of the protocol of the communication sequence. The request header 512 includes a character string indicating the request toward the server (the job registration (SUBMIT), the state alteration (ALTER), the deletion request (CANCEL), the queue enumeration (ENUMRATE), or the job-information acquisition (GET)), and information characteristic of the request such as a length of the body portion. The response header 532 includes information characteristic of the response such as a length of the body portion. The request body 521 includes content of the request (for example, in the case of SUBMIT, the name of the queue registering the job, the name given to the job, the name of a file executed as the job, and so on). The response body 541 includes content of the response.

In particular, it is possible to describe a plurality of scripts in the request body 521. FIG. 6 illustrates an example of the description of the scripts in the request body 521. SENDSCRIPT=yes; is a declaration that the scripts are transferred from this position. SCRIPTSTART=script/scriptb; declares that a script to be executed first is a scriptb. SCRIPTNAME=script/scripta; is a file name of a script transferred actually, and here the scripta is the file name. SCRIPTLINES=4; indicates the line number of content of the scripts subsequent thereto. Here, the lines of SCRIPTBODY= . . . ; by the number of 4 lines starting from the line next to SCRIPTLINES=4; are the actual content of the scripta. SUBSET=END indicates the end of the scripta. In much the same way, the scriptb is described next. Repeating this allows the plurality of scripts to be described in the request body 521. A final (NULL) indicates the end of the request data stream transferred.

FIG. 7 illustrates a job parameter definition file that, in the case where the client is a Windows NT-based machine, the client uses when issuing the above-described various types of requests. When a job is registered from the client to the server, the job parameter definition file of the content like this is created and is passed to a command analyzing unit (911 in FIG. 9) inside the client, which is described later. Then, the command analyzing unit analyzes this job parameter definition file, thereby creating the above-described request data stream so as to transfer the request data stream to the server.

The job parameter definition file illustrated in FIG. 7 is a text-based file of so-called INI file format. Its content may be set/edited by an application program for receiving the job registration by the user, or can also be set/edited by a variety of text editors. A portion indicated by [Trans] within the job parameter definition file is a portion for specifying a plurality of files to be transferred. This portion allows the plurality of scripts to be included into the transfer data. Concretely, the respective scripts are created as one script file each, and the script files are specified as the transfer files in [Trans]. Incidentally, a unit in which the scripts are counted one by one is based on a grammar describing the scripts. Consequently, it is also possible to describe the plurality of scripts in one script file. In that case, it is sufficient to specify the plurality of script files as the transfer files in [Trans].

FIGS. 8A, 8B and 8C illustrate examples of a job registering command in the case of the UNIX. As illustrated in FIG. 8A, a job is registered by a qsub command. At that time, the specification is carried out to the operand as "-t transfer source file name=transfer target file name" ("transfer target file name" need not be specified), thereby making it possible to transfer the specified file. This allows a script file to be transferred. FIG. 8B illustrates a concrete example where the script file is transferred by the qsub command. Here, it is instructed to store test01.jcl, i.e., a script file on the UNIX, into the transfer target in the name of script (scripta). FIG. 8C illustrates an example where two script files are transferred. Test01.jcl, i.e., the script file on the UNIX, is stored into the transfer target in the name of script (scripta), and test01.jcl2, i.e., a script file on the UNIX, is stored into the transfer target in the name of script (scriptb). A declaration of—start "script (scriptb)" specifies the script (scriptb) as a script file to be executed first.

Figure 9:
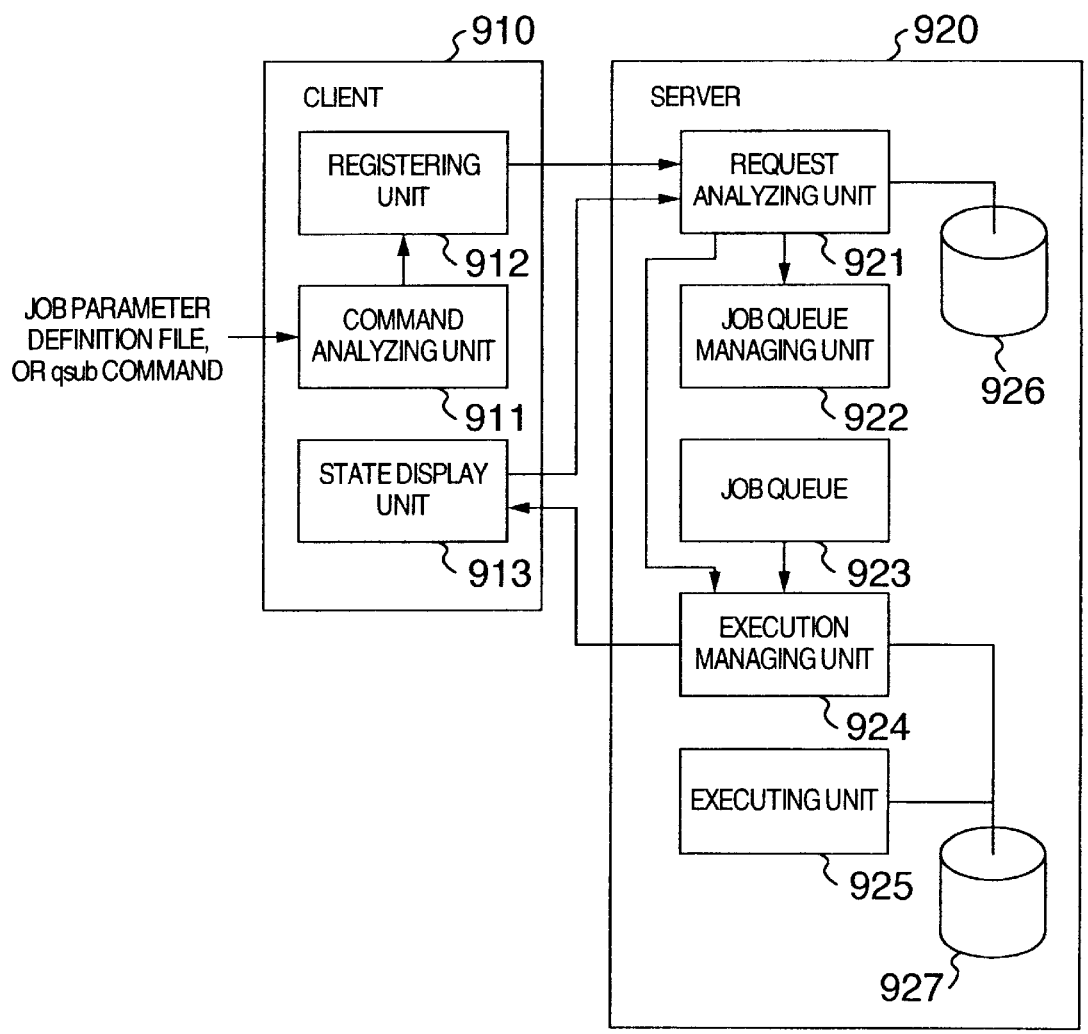
FIG. 9 is a diagram for illustrating the internal configuration of a client and a server relating to a job registration and a response to the execution result.

FIG. 9 is a diagram for illustrating the internal configuration of a client and a server relating to a job registration and a response to the execution result. A client 910 includes the following: The command analyzing unit 911, a registering unit 912, and a state display unit 913. A server 920 includes the following: A request analyzing unit 921, a job queue managing unit 922, a job queue 923, an execution managing unit 924, an executing unit 925, a script file storing unit 926, and an execution-result storing unit 927.

Based on the instruction from the user, the command analyzing unit 911 creates the request data stream. If, for example, the client 910 is the Windows NT-based machine, the job parameter definition file as explained in FIG. 7 is created and passed to the command analyzing unit 911. Then, in accordance with the content of the job parameter definition file, the command analyzing unit 911 creates the request data stream as explained in FIGS. 5A and 6. If the client 910 is the UNIX-based machine, the qsub command as explained in FIGS. 8A to 8C is inputted into the command analyzing unit 911. Then, in accordance with the specification by the qsub command, the command analyzing unit 911 creates the request data stream as explained in FIGS. 5A and 6. In either case, it is possible to perform the job registration including the plurality of scripts.

The request data stream created by the command analyzing unit 911 is inputted through the registering unit 912 into the request analyzing unit 921 situated in the server 920. The very protocol of the data transmission/reception at this time has been explained already in FIGS. 2 to 6. The request analyzing unit 921 in the server 920 receives and analyzes the request data stream. If a script is included in the request data stream, the request analyzing unit extracts the script, storing it into the script file storing unit 926. On this occasion, if a plurality of scripts are included in the request data stream, the request analyzing unit stores the respective scripts into the script file storing unit 926 in such a manner that the respective scripts are filed as one script file each. For instance, in the case where the request data stream as illustrated in FIG. 6 has been inputted, the scripts therein are stored into the script file storing unit 926 as the two script files of the scripta and the scriptb. Incidentally, it may be considered that the server 920 in FIG. 9 has the function of the server gateway as well that is illustrated in FIG. 2.

Figure 10:
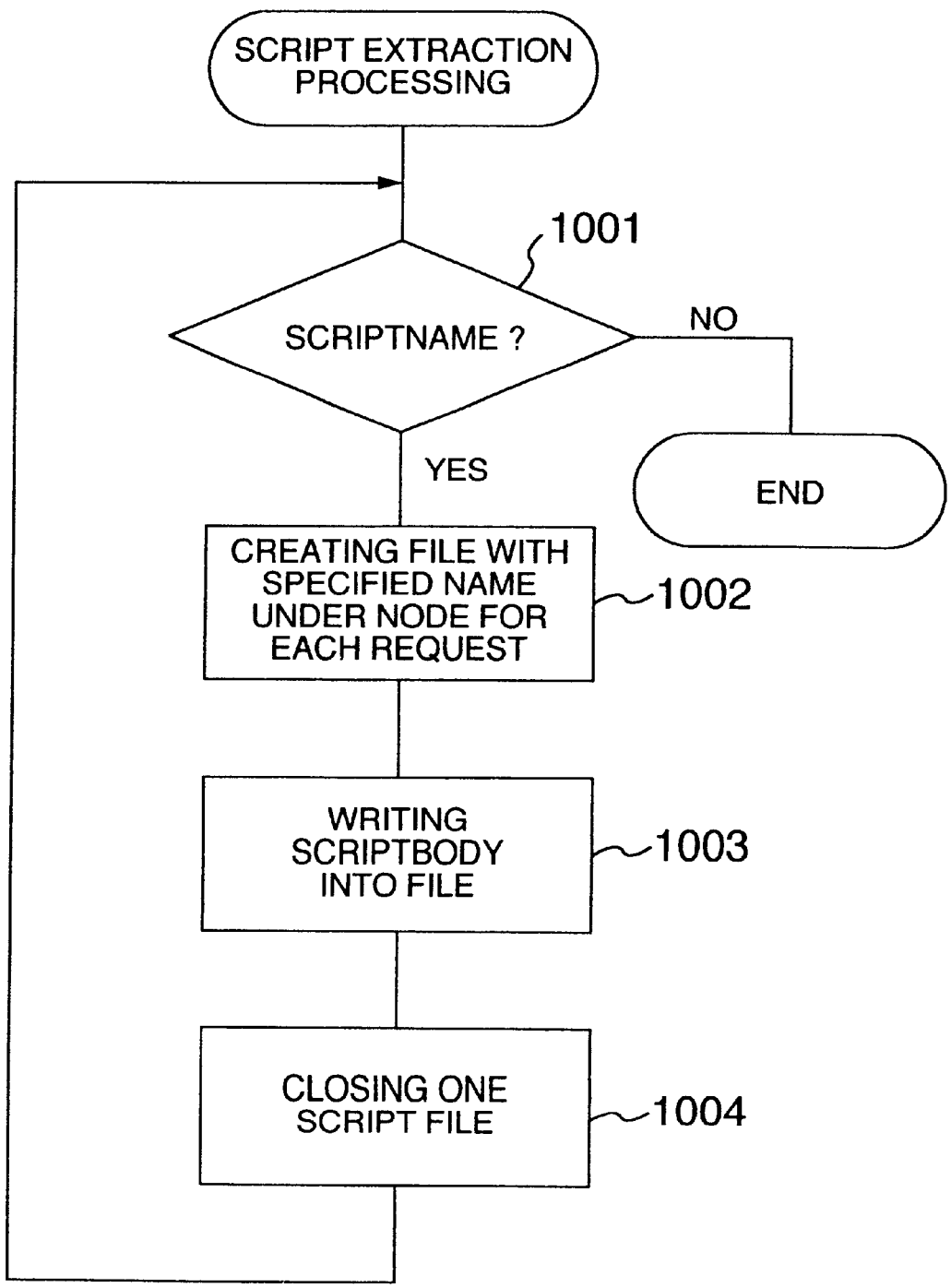
FIG. 10 is a flow chart for illustrating the procedure of a script extraction processing.

FIG. 10 illustrates the procedure of the script extraction processing, which is a portion of the analysis processing of the request data stream in the request analyzing unit 921 and is executed when SENDSCRIPT=yes; is detected. When SENDSCRIPT=yes; is detected, at a step 1001, it is judged whether or not the next line is a line of SCRIPTNAME=. If the next line is the line of SCRIPTNAME=, at a step 1002, a script file with a specified name is created under a request-by-request node in the script file storing unit 926. Next, at a step 1003, SCRIPTLINES that is subsequent to the line of SCRIPTNAME= is read out, and lines of SCRIPTBODY by the number of the read lines are read out and are written into the above-described script file. The script file is closed at a step 1004 and, going back to the step 1001 as indicated by an arrow, it is judged whether or not there exists the next SCRIPTNAME=. Hereinafter, the processing similar to the above-mentioned processing is repeated, thereby extracting all the scripts included in the request data stream and writing them into the respective script files of their own. This operation stores, into the script file storing unit 926, all the scripts included in the request data stream that has been sent.

Now, going back to FIG. 9, the request analyzing unit 921 in the server 920, along with the script extraction as described above, registers a job into the job queue 923 through the job queue managing unit 922. If the request data stream sent from the client includes no script and is a request for executing one command (program file) alone, an executing instruction for the command is registered into the job queue 923. Also, if the request data stream sent from the client includes one script, an executing instruction for the one script is registered into the job queue 923. If the request data stream sent from the client includes a plurality of scripts, an executing instruction for a script (hereinafter, referred to as a main script) to be executed first of those scripts is registered into the job queue 923.

Additionally, in the request data stream that the client 910 creates and sends to the server 920, a file name to be executed first in the server is specified. Accordingly, if the request data stream includes no script and is the request for executing one command (program file) alone, a file name of the one command should have been specified as the file name to be executed first in the request data stream. Similarly, if the request data stream includes the plurality of scripts, a file name of the script to be executed first should have been specified as the file name to be executed first in the request data stream. In other words, the request data stream sent from the client includes the executing instruction for the command or the script to be executed first. This condition makes it possible to regard the executing instruction as being fetched from the request data stream and registered in the job queue.

Figure 11:
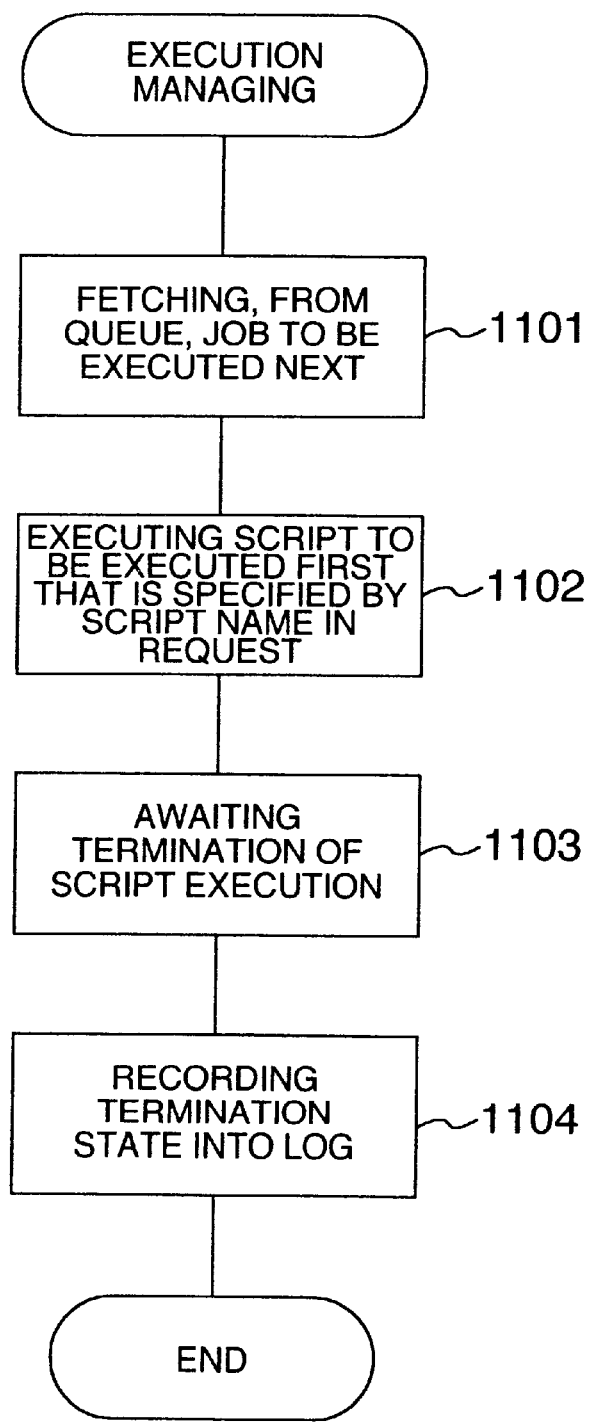
FIG. 11 is a flow chart for illustrating a processing routine (a portion) of an execution managing unit.

FIG. 11 illustrates a processing routine (a portion) of the execution managing unit 924 in the server 920. At first, at a step 1101, the execution managing unit 924 fetches, from the job queue 923, a job to be executed next. The judgement as to which job is the job to be executed next is based on specification of the OS (operating system). Next, at a step 1102, the job thus fetched is passed to the executing unit 925 so as to be executed. If the fetched job is an executing instruction for executing one command alone, it is sufficient to execute the one command. If the fetched job is an executing instruction for executing one script, the one script is executed. When a plurality of scripts are being sent, the main script is executed. Although there are some cases where, during the execution of the main script, a lower-order script is called and executed. In such a case, the necessary script is fetched from the script file storing unit 926 so as to be executed since, by the processing in FIG. 10, all the scripts have been stored already in the script file storing unit 926.

Next, at a step 1103, it is awaited for the execution of the script (at the time of executing a command, the command) to be terminated. After the termination, at a step 1104, the termination state is recorded (by the executing unit 925, actually) into the execution-result storing unit 927 as a log, thereby completing the processing. Examples of the information recorded as the log are job names, script names, result file names, and so on. The result file name is the name of a result file created for each of the commands (at the time of executing the script, each of the commands executed in the script) executed at the step 1102. Each of the commands is executed, thereby creating the result file in the name that is unique to the command and storing the result file into the execution-result storing unit 927. Consequently, in the case where a plurality of commands are executed by the execution of the script (Usually, one script includes a plurality of commands), the result files for the respective commands are created.

As having been described above, the registration and the execution of the batch job are performed. The client 910 further includes the state display unit 913, which makes it possible to perform the job-information acquisition (GET) concerning a registered job. Namely, in FIG. 9, in accordance with, for example, an instruction from the user, the state display unit 913 issues, to the request analyzing unit 921 in the server 920, a request for the job-information acquisition (GET) for inquiring in what state the registered job lies at present. The request for the job-information acquisition (GET) includes information such as a job name for identifying the object job the job information of which will be acquired. The request analyzing unit 921 passes, to the execution managing unit 924, the information such as the job name for identifying the job the job-information acquisition of which has been requested, thus instructing the job-information acquisition.

Figure 12:
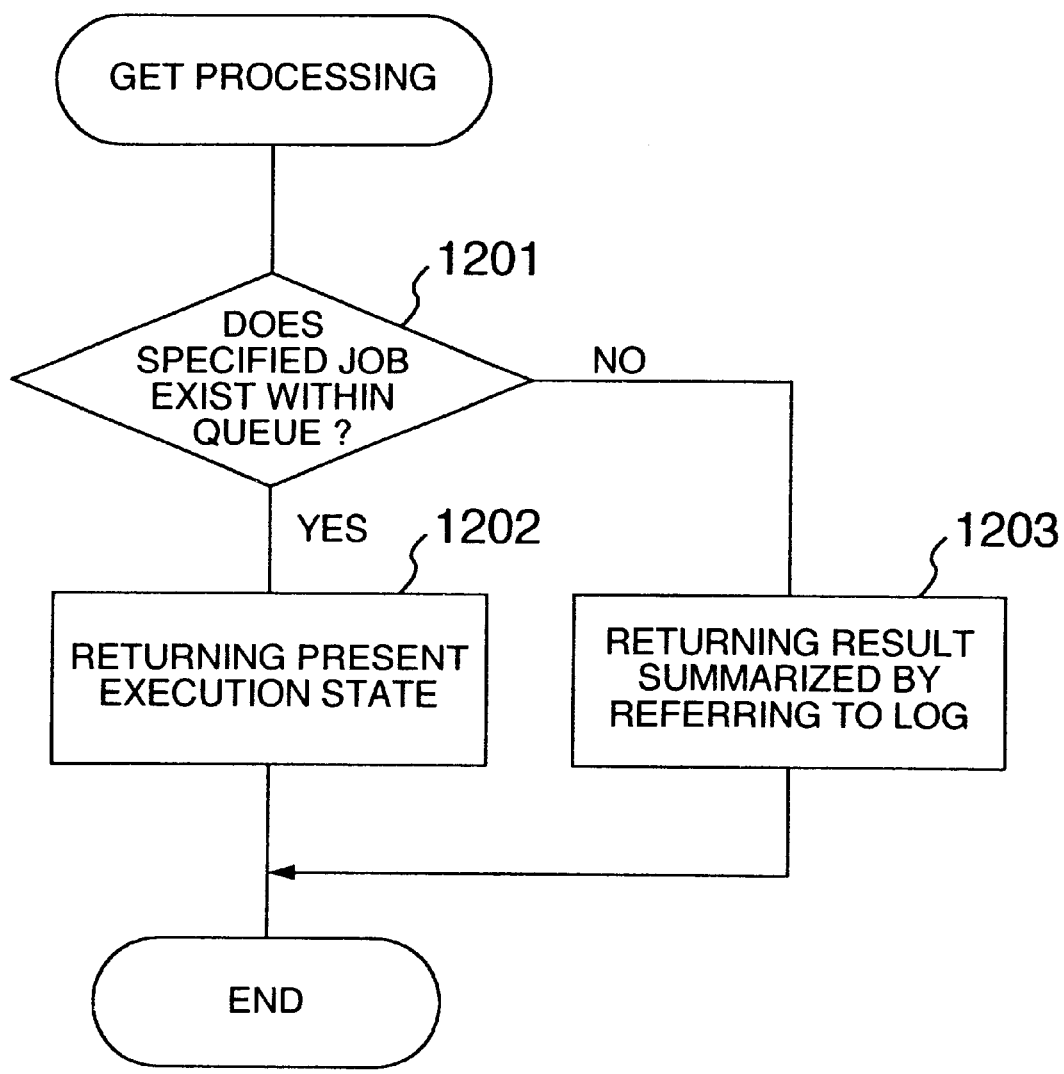
FIG. 12 is a flow chart for illustrating the procedure of a job-information GET processing.

FIG. 12 illustrates the procedure of the job-information GET processing. The execution managing unit 924 in the server 920 performs the job-information GET processing in accordance with the instruction passed from the request analyzing unit 921. At a step 1201, by referring to the job queue 923, it is judged whether or not a specified job exists within the job queue 923. If the specified job exists within the job queue 923, it means that, at present, the job is awaiting the execution or is in the course of the execution. Accordingly, the state where the job lies is returned back to the state display unit 913 in the client 910 of the request issue source. If the specified job does not exist within the job queue 923, it means that the execution has been terminated already. Accordingly, by referring to the log stored in the execution-result storing unit 927, information to be returned back of the content of the log is summarized as the response data, then being returned back to the state display unit 913.

In particular, in this embodiment, the plurality of result files are stored into the execution-result storing unit 927 by executing the plurality of scripts. Consequently, in the job-information acquisition (GET), it is made possible to summarize and return the plurality of result files back to the client. Namely, when the request for the job-information acquisition (GET) is issued from the state display unit 913 in the client 910 in FIG. 9, a plurality of names of the result files that are wished to be returned back are specified within the request. At a step 1203, the execution managing unit 924 collects the plurality of result files with those specified names and creates the response data stream (FIG. 6) including the content of those result files, then returning the response data stream back to the state display unit 913 in the client 910 in the communication sequence as explained in FIGS. 2 and 4.

Incidentally, in order to create the response data stream including the content of the plurality of result files and send the response data stream to the state display unit 913 in the client 910, the execution managing unit 924 in the server 920 has the function of creating the response data stream including the content of the plurality of result files. Moreover, in order to reproduce the plurality of result files at the state display unit 913, the state display unit 913 in the client 910 has the function of reproducing the plurality of result files from within the received response data stream. Concretely, in much the same way as the one in which the request data stream is created that includes the content of the plurality of script files as explained in FIG. 5, by doing the following, the execution managing unit 924 creates a response data stream including the content of the result files of arbitrary numbers: With a tag for making a declaration that a result file will be sent, the declaration is made, and with a tag for specifying the result file name, the result file name is specified, and with a tag for specifying the number of lines, the number of lines of the result file is specified. After that, the contents of the result files are enumerated, and with SUBSET=END, the end of the result files is specified, and the above-mentioned portion ranging from the specification of the result file name to SUBSET=END is repeated. Also, in much the same way as the one in which, in FIG. 10, the plurality of scripts are extracted and reproduced as the files each, the state display unit 913 that has received such a response data stream reproduces the plurality of result files from within the response data stream.

FIG. 13 illustrates an example of a job registration screen in the client 910. The user has created in advance the script files test01.jcl and test01.jcl2, using the text editor or the like. When registering a job, the user instructs the screen in FIG. 13 to be displayed and checks "specify" 1302 in script transfer definition 1301, thereby being able to specify the script transfer. In a script file specification region 1303, it is possible to describe a plurality of script files to be transferred to the server. It is also possible to specify a script file to be executed first of the plurality of script files. In FIG. 13, as the script file to be executed first, the test01.jcl2 is described in being surrounded by a rectangular frame within the specification region 1303. Various types of information is set on the screen in FIG. 13 and an acknowledge button 1304 is switched on. This operation causes, for example, the qsub command explained in FIG. 8C, to be inputted into the command analyzing unit 911 in FIG. 9, thereby making it possible to perform the job registration including the plurality of scripts as is described above.

Figure 14:
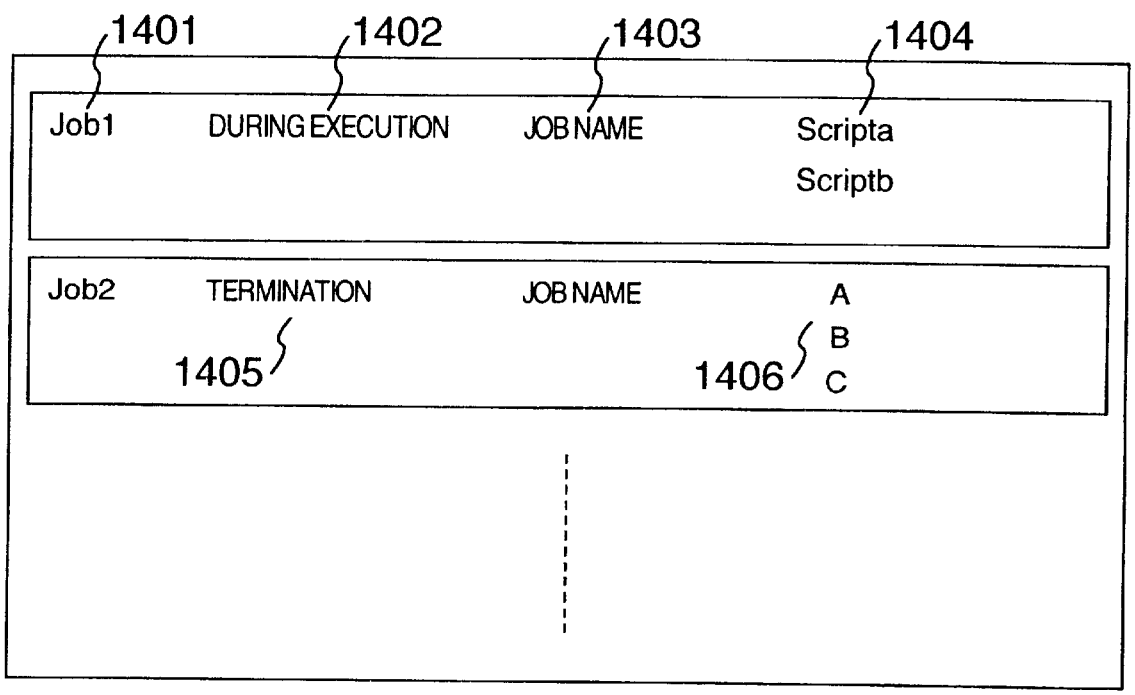

FIG. 14 illustrates an example of the job state display displayed by the state display unit 913 in the client 910 in FIG. 9. The state display unit 913 issues the request for the job-information acquisition (GET) with a predetermined time interval and acquires the present state of a job and the result file as is described earlier, then displaying them in a list as illustrated in FIG. 14. The reference numerals denote the following, respectively. 1401 sequential number of the job, 1402 a display for indicating that the present state of the job is "during execution", 1403 job name of the job, 1404 name of a script file included in the job. When a plurality of script files are included in the job, names of all the plurality of script files (in FIG. 14, scripta and scriptb) are displayed. The reference numerals further denote the following: 1405 a display of "termination" for indicating that a job Job2 has already been in the termination state, 1406 file name of a result file received from the server as a result of the termination of the job Job2. When a plurality of result files (in FIGS. 14, A, B, and C) are received, names of all the result files are displayed.

Incidentally, in the above-mentioned embodiment, the explanation has been given concerning the example where the job is registered from the client to the server. Taking advantage of the above-described protocol, however, allows the plurality of scripts to be transferred in much the same way even when the job is registered and executed from a server to another server. In the UNIX, it is usual that the job transfer is performed between the server/server so as to disperse the load. Consequently, it turns out that, naturally, the job registration from the UNIX-based client to another server is once performed by way of a server existing on the side of the client through a network. In that case, the communication taking advantage of the above-described protocol is executed between the server/server.

According to the embodiment explained so far, the data stream in the plain text is used as the job transfer protocol. This condition makes the implementation easy, not depending on the types of the network. Also, the various types of parameters are specified in the plain text by the expression using the tags. This condition makes it easy to extend the protocol. Even when the protocol has been extended and the types of the tags are increased in a higher-order version, a lower-order version system ignores a tag that it does not recognize, thereby making it possible to establish the mutual interconnection between the systems the versions of which are different to each other. Also, it is possible to implement the user interface and the implementing method with different kinds of variations in correspondence with the circumstances of the system.

What is claimed is:

1. A job transferring method for sending a request from a first computer to a second computer by using a Graphical User Interface (GUI) on said first computer, said job transferring method comprising the steps of:

displaying a plurality of options on a screen of said first computer, said plurality of options being necessary for causing said second computer to register and execute a job, and said options including file names of a plurality of scripts for said job;

selecting options including said file name from among said options in response to designation by a user viewing said screen;

creating, by said first computer, said request from the selected options, said request including a content of said plurality of scripts obtained from said file name; and sending said request from said first computer to said second computer.

2. The job transferring method according to claim 1, wherein said at least one script is a plurality of scripts each thereof having a unique file name, and said plurality of options include an option for designating a file name of a script to be executed first.

3. The job transferring method according to claim 1, further comprising the steps of:

receiving, by said first computer, a result of execution of said script from said second computer; and displaying said result on said screen of said first computer.

4. The job transferring method according to claim 1, further comprising a step of specifying at least one of execution date/time, a priority level and an execution holding of said job by using the GUI on said first computer.

5. A job transferring system for sending a request from a first computer to a second computer by using a Graphical User Interface (GUI) on said first computer, wherein said first computer comprises:

a display unit having a screen for displaying a plurality of options thereon, said options being necessary for causing said second computer to register and execute a job, and said options including file names of a plurality of scripts for said job;

a processing unit for selecting options including said file name from among said options in response to designation by a user viewing said screen;

a processing unit for creating said request from the selected options, said request including a content of said plurality of scripts obtained from said file name; and a processing unit for sending said request from said first computer to said second computer.

6. The job transferring system according to claim 5, wherein said at least one script is a plurality of scripts each thereof having a unique file name, and said plurality of options include an option for designating a file name of a script to be executed first.

7. The job transferring system according to claim 5, wherein said first computer further comprises:

a processing unit for receiving a result of execution of said script from said second computer; and said display unit of said first computer displays said result on said screen.

8. A computer readable storage medium storing a program executing the steps of the method according to claim 1.

9. A program to be stored on a computer readable storage medium, said program executing the steps of the method according to claim 1.

* * * * *